United States Patent [19]
White

[11] 4,086,750
[45] May 2, 1978

[54] ADJUSTABLE RAKE

[75] Inventor: Althea T. White, Fillmore, Calif.

[73] Assignee: The Raymond Lee Organization, Inc., New York, N.Y.

[21] Appl. No.: 695,700

[22] Filed: Jun. 14, 1976

[51] Int. Cl.² .............................................. A01D 7/00
[52] U.S. Cl. .................................................. 56/400.18
[58] Field of Search ............ 56/400.18, 400.19, 400.2; 294/53.5; 172/371, 372, 373, 378

[56] References Cited
U.S. PATENT DOCUMENTS

| | | | |
|---|---|---|---|
| 485,372 | 11/1892 | Dennis | 172/373 |
| 2,532,526 | 12/1950 | Wells | 56/400.18 |
| 2,904,951 | 9/1959 | Glover | 56/400.18 |
| 3,258,903 | 7/1966 | Rienacker et al. | 56/400.18 |
| 3,701,243 | 10/1972 | Durkee | 56/400.18 |

*Primary Examiner*—Russell R. Kinsey
*Attorney, Agent, or Firm*—Howard I. Podell

[57] ABSTRACT

A fan shaped rake fitted with a plurality of individual prongs pivotably mounted to the end of the rake pole, together with a sleeve slidably fitted about the rake pole which may be slid to a first position to fold the prongs to lie along the axis of the pole and to a plurality of extended positions which open the rake prongs in fan wise fashion.

3 Claims, 4 Drawing Figures

U.S. Patent    May 2, 1978    4,086,750
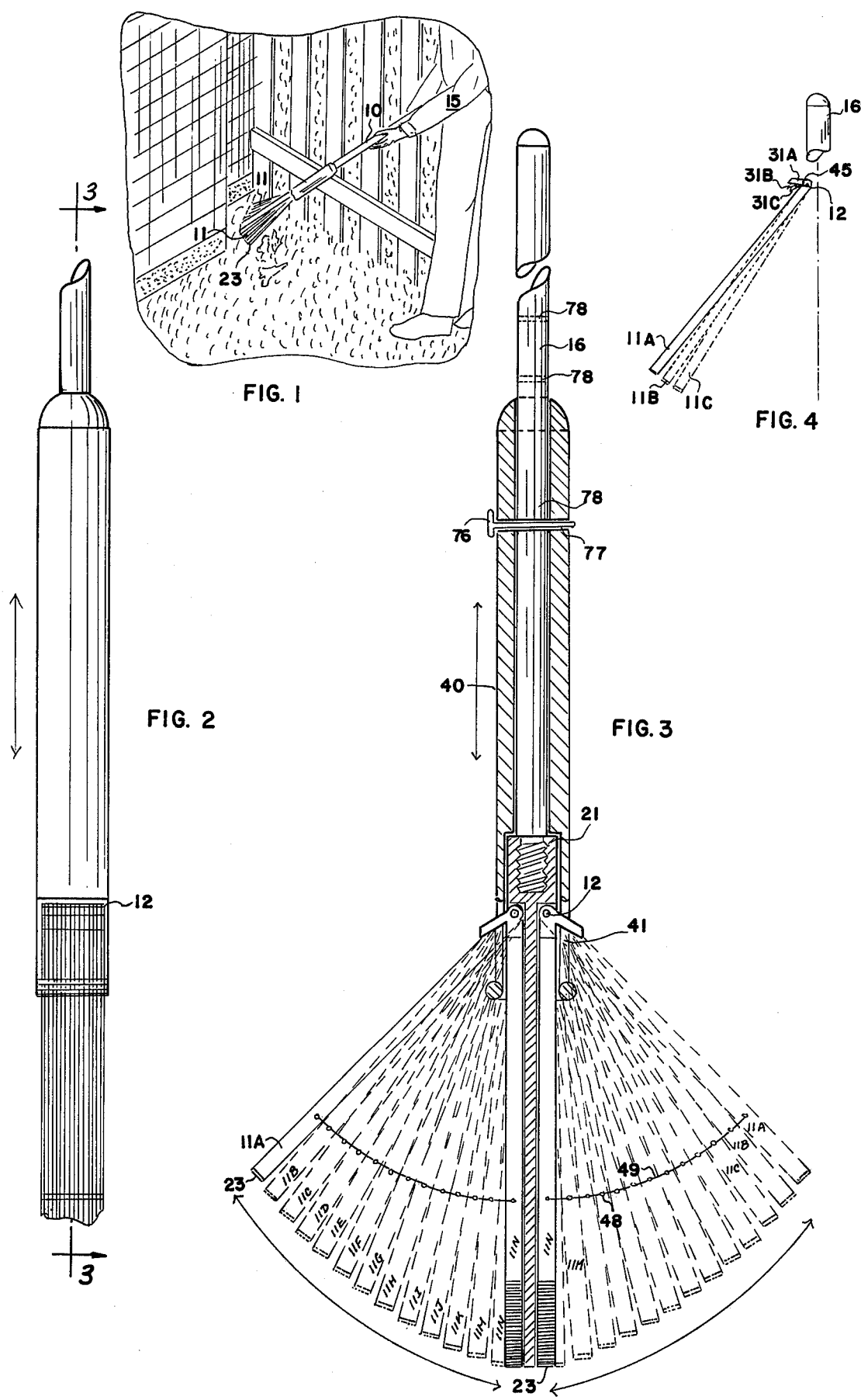

ADJUSTABLE RAKE

SUMMARY OF THE INVENTION

My invention is a fan shaped rake fitted with a plurality of individual prongs pivotably mounted to the end of the rake pole, together with a sleeve slidably fitted about the rake pole which may be slid to a first position to fold the prongs to lie along the axis of the pole and to a plurality of extended positions which open the rake prongs in fan wise fashion.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is an enlarged detail side view of the invention;

FIG. 3 is an elevation view of the invention, taken along line 3—3 of FIG. 2; and FIG. 4 is a detail elevation view of the invention.

DESCRIPTION OF THE PREFERRED EMBODIMENT

Turning now descriptively to the drawings, in which similar reference characters denote similar elements throughout the several views, FIGS. 1-4 illustrate the expandable rake 10, fitted with the rake prongs 11 individually pivoted to one of a pair of pins 12 so that the prongs 11 may be rotated to form a fan of prongs 11 of a varying width, depending on the size of the area to be raked by the user 15.

A rake pole 16 is axially threadably fastened at its operating end to a socket member 21 with a pair of spaced parallel pivot pins 12 laterally mounted to the socket member 21 and with a plurality of two sets of rake prongs 11A–11N with each set pivotably mounted to an individual pin 12.

Each prong 11A–11N is fitted at its end with a bent flanged tooth 23, and each prong, such as prong 11D is of a shorter length than the adjacent prong 11E which is nearer to the rake axis in the extended position, shown in dash lines in FIG. 3, so that all prongs 11A–11N of a set nest within each other when folded in axial configuration.

An angled lever 31A–31N is fixed to the pivot end of each prong 11A–11N respectively so that in the folded configuration of the prongs, as shown in solid lines in FIGS. 2-3, the axis of all levers 31A–31N are oriented along a common plane, while in the extended mode of the rake prongs, pivoted about pin 12, each lever such as the lever 31A of a rake prong extends a greater angle from the pole axis than does the lever 31B of the next adjacent longer rake prong 11B.

A sleeve 40 is slidably mounted on rake pole 16 to slide past attached socket member 21, with sleeve 40 provided with a slot 41 on each side of sleeve 40 through which levers 31A–31N of each set of rake prongs extend.

Each prong 11A–11N extends with a spring 45 fixed to a pin 12 to bias the prong away from the pole axis, such that sliding axial motion of sleeve 20 will bear against levers 31A–31N to extend or retract the prongs about the pivot pins 12. A flexible cord 49 may be fitted through a hole 48 in each prong to join the prongs together.

Pole 16 is formed with a plurality of spaced lateral holes 78, with sleeve 40 formed with one or more lateral holes 77, both holes 77 and 78 of a size to fit a removable pin 76 for fixing sleeve 40 in position on pole 16 so as to extend or retract prongs 11 to form a fan size of a given width or to extend along the axis of pole 16 in the fully retracted position.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A rake fitted with prongs pivotally mounted to a pole so that the prongs may be pivoted to form a fan of varying width, with means slidably mounted on the pole to fix the prongs in a given position of fan width, comprising a rake pole joined at one end to a socket member, with at least one pin fixed to said socket member, a plurality of rake prongs each pivotally mounted to a said pin, with each rake prong formed with a lever section that extends from the attached rake prong at an angle offset from the axis of the said rake prong, together with a sleeve unit slidably mounted about the rake pole and shaped so as to be slidable over said socket member so that a section of said sleeve unit may bear against each of the levers of said rake prongs when the sleeve is slid on the rake pole so as to cause the rake prongs to each pivot about the said pin.

2. The rake as described in claim 1 in which at least one slot is formed in the sleeve unit with the slot located on the sleeve unit so that each of the levers of the rake prongs extend into the interior of a said slot, with an end wall of each said slot serving as the section of the sleeve unit that bears against the rake prong levers.

3. The rake as described in claim 4 together with spring means associated with each rake prong, said spring means mounted to each rake prong so as to bias each of the rake prongs in a given direction of rotation about the pin fixed to the socket member.

* * * * *